US010417685B2

(12) United States Patent
Drye et al.

(10) Patent No.: US 10,417,685 B2
(45) Date of Patent: Sep. 17, 2019

(54) CONTEXT DEPENDENT DATA MANAGEMENT AND DISPLAY

(71) Applicant: Oracle International Corporation, Redwood Shores, CA (US)

(72) Inventors: Stephen Drye, Arlington, MA (US); Sean Kauffman, Seattle, WA (US); Matthew Landau, Arlington, MA (US)

(73) Assignee: Oracle International Corporation, Redwood Shores, CA (US)

( * ) Notice: Subject to any disclaimer, the term of this patent is extended or adjusted under 35 U.S.C. 154(b) by 694 days.

(21) Appl. No.: 13/949,652

(22) Filed: Jul. 24, 2013

(65) Prior Publication Data

US 2014/0372256 A1 Dec. 18, 2014

Related U.S. Application Data

(60) Provisional application No. 61/835,052, filed on Jun. 14, 2013.

(51) Int. Cl.
*G06Q 30/06* (2012.01)

(52) U.S. Cl.
CPC ..... *G06Q 30/0627* (2013.01); *G06Q 30/0603* (2013.01)

(58) Field of Classification Search
CPC ....................... G06Q 30/0627; G06Q 30/0603
USPC .................................... 705/26.1–27.2, 26.63
See application file for complete search history.

(56) References Cited

U.S. PATENT DOCUMENTS

| | | | | |
|---|---|---|---|---|
| 8,370,203 B2 | | 2/2013 | Dicker et al. | |
| 8,452,785 B1 | * | 5/2013 | Iida | G06Q 30/0601 705/26.7 |
| 2002/0184116 A1 | * | 12/2002 | Tam | G06Q 30/0641 705/27.1 |
| 2003/0120550 A1 | * | 6/2003 | Peyrelevade | G06Q 30/06 705/27.2 |
| 2004/0006516 A1 | * | 1/2004 | Anagol-Subbarao | G06Q 30/0633 705/26.8 |
| 2005/0193055 A1 | * | 9/2005 | Angel | G06Q 30/02 709/202 |

(Continued)

FOREIGN PATENT DOCUMENTS

| | | |
|---|---|---|
| WO | 2012145931 A1 | 11/2012 |
| WO | 2013029233 A1 | 3/2013 |

OTHER PUBLICATIONS

Beck, Philip D; DeLuca, Thomas J., The New Global Merchant, Feb. 2000, Penton Media, 0740-3119, 3816, p. 1. (Year: 2000).*

(Continued)

*Primary Examiner* — Jason B Dunham
*Assistant Examiner* — Brittany E Bargeon
(74) *Attorney, Agent, or Firm* — Potomac Law Group, PLLC

(57) ABSTRACT

A system receives a request for item data from a stored data set. The request may include a specified context for providing the item data. The stored data set includes an item, at least one common item attribute, a value for each of the common item attributes, and at least one context item attribute. The system provides the requested item data. The provided item data includes context attribute values for the specified context and common attribute values for attributes that are not in the specified context attributes.

21 Claims, 7 Drawing Sheets

(56) References Cited

U.S. PATENT DOCUMENTS

| | | | | |
|---|---|---|---|---|
| 2008/0077504 | A1* | 3/2008 | Gausebeck | G06Q 30/02 705/26.1 |
| 2008/0082415 | A1* | 4/2008 | Shastry | G06Q 30/02 705/14.43 |
| 2008/0222011 | A1* | 9/2008 | Gopal | G06Q 30/0601 705/27.1 |
| 2009/0006216 | A1* | 1/2009 | Blumenthal et al. | 705/26 |
| 2009/0177714 | A1* | 7/2009 | Obermeyer | G06Q 30/0603 |
| 2010/0057585 | A1* | 3/2010 | Neal | G06Q 30/0601 705/26.1 |
| 2011/0161883 | A1* | 6/2011 | Kennedy et al. | 715/835 |
| 2011/0251914 | A1* | 10/2011 | Caine | G06Q 30/0601 705/26.1 |
| 2012/0166308 | A1* | 6/2012 | Ahmed et al. | 705/26.41 |
| 2012/0260211 | A1* | 10/2012 | Sathish et al. | 715/784 |
| 2012/0290434 | A1 | 11/2012 | Moritz et al. | |
| 2012/0311139 | A1 | 12/2012 | Brave et al. | |
| 2013/0007063 | A1* | 1/2013 | Kalra et al. | 707/796 |
| 2013/0254010 | A1* | 9/2013 | Letca et al. | 705/14.35 |
| 2014/0172634 | A1* | 6/2014 | Dogin et al. | 705/26.8 |

OTHER PUBLICATIONS

Oracle Data Sheet, “The Oracle Recommendations on Demand Solution”, © 2011.

* cited by examiner

302

```
304 <item id='1234'>
306  <title>Super Clear Racing Goggles</title>
308  <description>These goggles will give you the edge, with wall to wall visibility
       and unmatched UV protection</description>
310  <link>http://mysite.com/products.jsp?productId=1234</link>
312  <price>24.95</price>
314  <instock>true</instock>
     ...
316  <context id='US-Sports'>
318    <title>Crystal Clear Comfort Goggles</title>
320    <description>Ultra-clear polycarbonate lenses provide protection for swimming
         and paintball.  Purchase this item and donate $2 to U.S. Olympics</description>
322    <link>http://sports.acme.com/eyewear/product.jsp?productId=1234</link>
324    <image_link>http://images.mysite.com/images/paintball_goggles.jpg</image_link>
326    <attribute name="colors" type="list" elementType="string">red, blue, clear,
         gray</attribute>
328    <price>26.95</price>
330    <instock>false</instock>
332    <olympic-donation>2.00</olympic-donation>
     </context>
334  <context id='US-Swimming'>
336   <title>Super Clear Competition Goggles</title>
338   <description>Low profile design reduces drag for better lap times. Ultra-clear
        polycarbonate lenses let you keep an eye on the competition. Comfort strap
        provides a secure fit.</description>
340   <link>http://swimming.mysite.com/goggles/product.jsp?productId=1234</link>
342   <image_link>http://images.mysite.com/images/racing_goggles.jpg</image_link>
344   <attribute name="colors" type="list" elementType="string">fire, water, air,
        smoke</attribute>
     </context>
    </item>
```

| 352 retailer-id | 354 context-id | 356 item-id | 358 name | 360 value | 362 entry-type | 364 collection-type | 366 sequence-number |
|---|---|---|---|---|---|---|---|
| 1 | c.data | 1234 | title | Super Clear Racing Goggles | 0 | 0 | 0 |
| 1 | c.data | 1234 | description | These goggles will give you the edge, with wall to wall visibility and unmatched UV protection | 0 | 0 | 0 |
| 1 | c.data | 1234 | link | http://mysite.com/products.jsp?productId=1234 | 5 | 0 | 0 |
| 1 | c.data | 1234 | price | 24.95 | 2 | 0 | 0 |
| 1 | c.data | 1234 | instock | true | 1 | 0 | 0 |
| 1 | US-Sports | 1234 | title | Crystal Clear Comfort Goggles | 0 | 0 | 0 |
| 1 | US-Sports | 1234 | description | Ultra-clear polycarbonate lenses provide protection for swimming and paintball. Purchase this item and donate $2 to U.S. Olympics. | 0 | 0 | 0 |
| 1 | US-Sports | 1234 | link | http://sports.acme.com/eyewear/product.jsp?productId=1234 | 5 | 0 | 0 |
| 1 | US-Sports | 1234 | image_link | http://images.mysite.com/images/paintball_goggles.jpg | 5 | 0 | 0 |
| 1 | US-Sports | 1234 | colors | red | 0 | 1 | 0 |
| 1 | US-Sports | 1234 | colors | blue | 0 | 1 | 1 |
| 1 | US-Sports | 1234 | colors | clear | 0 | 1 | 2 |
| 1 | US-Sports | 1234 | colors | gray | 0 | 1 | 3 |
| 1 | US-Sports | 1234 | price | 26.95 | 2 | 0 | 0 |
| 1 | US-Sports | 1234 | instock | false | 1 | 0 | 0 |
| 1 | US-Sports | 1234 | olympic-donation | 2.00 | 2 | 0 | 0 |
| 1 | US-Swimming | 1234 | title | Super Clear Competition Goggles | 0 | 0 | 0 |
| 1 | US-Swimming | 1234 | description | Low profile design reduces drag for better lap times. Ultra-clear polycarbonate lenses let you keep an eye on the competition. Comfort strap provides a secure fit. | 0 | 0 | 0 |
| 1 | US-Swimming | 1234 | link | http://swimming.mysite.com/goggles/product.jsp?productId=1234 | 5 | 0 | 0 |
| 1 | US-Swimming | 1234 | image_link | http://images.mysite.com/images/racing_goggles.jpg | 5 | 0 | 0 |
| 1 | US-Swimming | 1234 | colors | fire | 0 | 1 | 0 |
| 1 | US-Swimming | 1234 | colors | water | 0 | 1 | 1 |
| 1 | US-Swimming | 1234 | colors | air | 0 | 1 | 2 |
| 1 | US-Swimming | 1234 | colors | smoke | 0 | 1 | 3 |

Fig. 3b

CONTEXT DEPENDENT DATA MANAGEMENT AND DISPLAY

CROSS REFERENCE TO RELATED APPLICATIONS

This application claims priority of Provisional Patent Application Ser. No. 61/835,052, filed on Jun. 14, 2013, the contents of which is hereby incorporated by reference.

FIELD

One embodiment is directed generally to an electronic catalog system, and in particular to an electronic catalog system that defines values for different contexts.

BACKGROUND INFORMATION

Electronic catalogs of items allow retailers to present their items for sale on interactive web sites. Such a web site may allow a user to select and purchase an item through the web site. Sometimes a retailer will want to present their items for sale in different ways depending on the context in which the item is presented. For example, one retailer may want to display the cost of a particular item in another form of currency for users accessing its web site from a country non-native to the retailer.

When retailer web sites need to present different data associated with an item depending on the context in which the item is presented, typically an item either needs to be entered into an electronic catalog system multiple times, one for each context, or complex coding must be implemented in the display presentation software to choose the appropriate data to display for the context.

SUMMARY

In one embodiment a system receives a request for item data from a stored data set. The request may include a specified context for providing the item data. The stored data set includes an item, at least one common item attribute, a value for each of the common item attributes, and at least one context item attribute. The system provides the requested item data. The provided item data includes context attribute values for the specified context and common attribute values for attributes that are not in the specified context attributes.

BRIEF DESCRIPTION OF THE DRAWINGS

FIG. 3*a* illustrates example Extensible Markup Language ("XML") data for an item in accordance with one embodiment.

FIG. 3*b* illustrates example data for the items in FIG. 3*a* that may be a representation of item data stored in a database in accordance with one embodiment.

DETAILED DESCRIPTION

One embodiment receives data containing properties of an item in an electronic catalog including default data and context-specific data for an item. The system stores provided data. The system receives a request to display data for an item for a particular context associated with the item. Based on the requested context, the system selects the data to return for display. The selected data may include both context-specific data and default data for properties not defined by the context-specific data. The system sends the selected data to be displayed.

Figure 1:
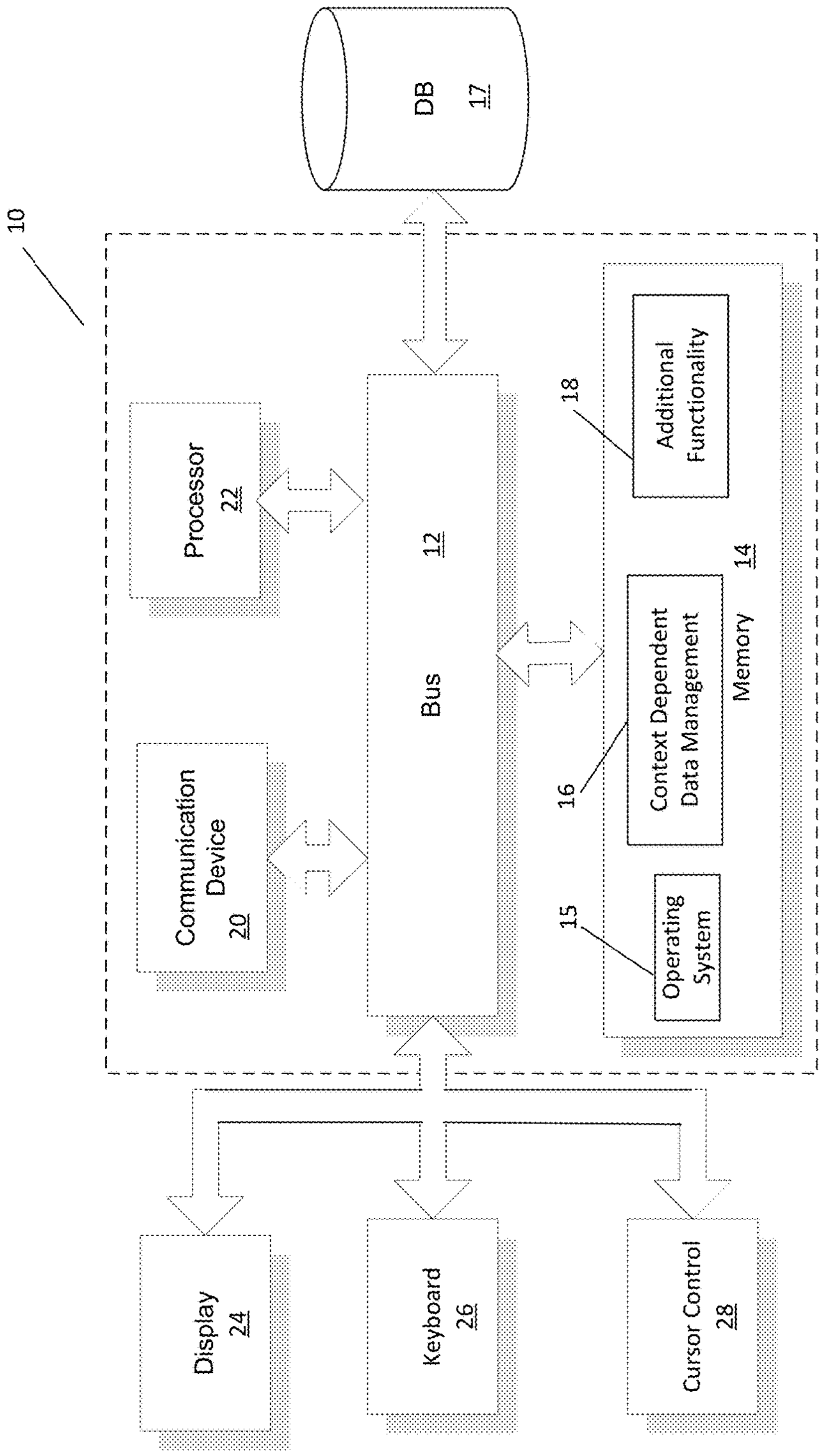
FIG. 1 is a block diagram of a computer server/system in accordance with an embodiment of the present invention.

FIG. 1 is a block diagram of a computer server/system 10 in accordance with an embodiment of the present invention. Although shown as a single system, the functionality of system 10 can be implemented as a distributed system. System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network or any other known method.

Computer readable media may be any available media that can be accessed by processor 22 and includes both volatile and nonvolatile media, removable and non-removable media, and communication media. Communication media may include computer readable instructions, data structures, program modules or other data in a modulated data signal such as a carrier wave or other transport mechanism and includes any information delivery media.

Processor 22 is further coupled via bus 12 to a display 24, such as a Liquid Crystal Display ("LCD"). A keyboard 26 and a cursor control device 28, such as a computer mouse, are further coupled to bus 12 to enable a user to interface with system 10.

In one embodiment, memory 14 stores software modules that provide functionality when executed by processor 22. The modules include an operating system 15 that provides operating system functionality for system 10. The modules further include a context dependent data management module 16 that provides and processes contextual item data, as disclosed in more detail below. System 10 can be part of a larger system, such as a database management system, electronic catalog system, product recommendations system, or product search system. Therefore, system 10 will typically include one or more additional functional modules 18 to include the additional functionality. In one embodiment, additional functionality 18 is provided by "Recommendations on Demand" by Oracle Corp. A database 17 is coupled to bus 12 to provide centralized storage for modules 16 and 18 and store one or more data sets to support contextual data processing, etc. Some embodiments may not include all of the elements in FIG. 1.

One embodiment receives item data, including item attributes and item attribute values. In addition to optional item attributes, a particular set of attributes may be expected for all items. Item attributes and attribute values may be defined in addition to the expected attributes as a common attribute set. Item data may also include different attributes and values depending on the context for which the data may be accessed. For example, the data may be accessed through a particular web site, browser, device, or other access channel. Different attributes and attribute values may be defined for a particular item for each channel or context. Where an attribute from the default attribute set is not defined in a context, the common attribute set and values may be used for the context.

Electronic catalogs are used in support of ecommerce activities. A retailer may maintain a web site offering information for the products that it has available for purchase on its web site(s) or in its store(s). Such product information may include attributes describing aspects of the product, such as size, color, inventory status, price, description, uses, version, presentation and formatting information for displaying product information on a web page such as Cascading Style Sheets ("CSS") code or link statements, and the like. Some retailers would prefer to customize an item's attributes for a context of the item. For example, a retailer may wish to provide a description written in French for an item if the item is being purchased from a customer located in France. In addition, the inventory available for shipment to France may be different than the inventory available for shipment to other countries. Thus, the retailer may wish to provide different inventory levels depending on the context for which the item's information is being accessed. In another example, a retailer may wish to provide different colors of the same model item, each with different inventory levels. In yet another example, a retailer may wish to use edgy product images for a web site directed toward one demographic and conservative product images for a web site directed toward another demographic. In still another example, a retailer may wish to provide that some items are available in some contexts while unavailable in other contexts, such as a web site operating in one country where inventory may be shipped and a web site operating in another country where inventory is unavailable.

Typically, for a retailer to provide different contexts for the same or similar item, the retailer must include a different catalog of items for each context. An alternative may be to include complex presentation code, which may "break" if the data provider changes data formatting, to run on the display side to determine which information to display for an item.

Figure 2:
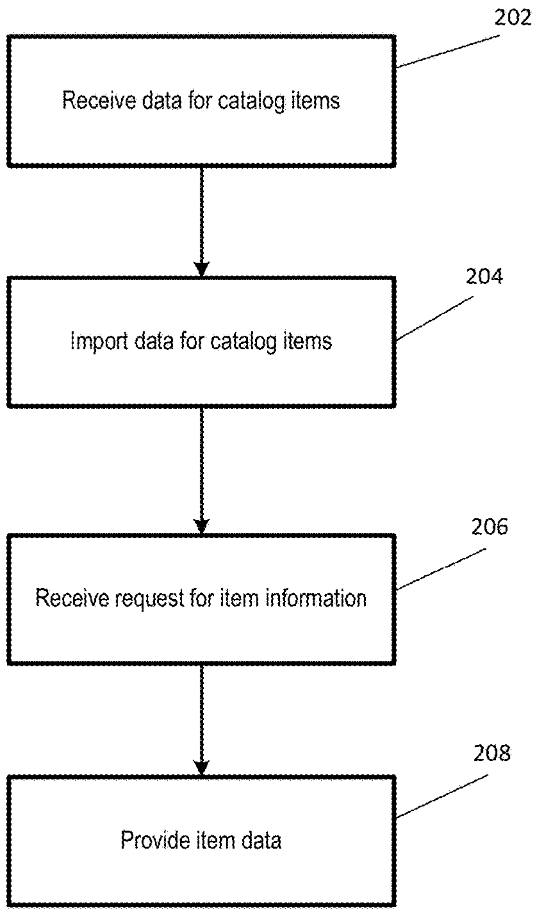
FIG. 2 is a flow diagram of the functionality of context dependent data management module of FIG. 1 when processing item data and item data requests in accordance with one embodiment.

FIG. 2 is a flow diagram of the functionality of context dependent data management module 16 of FIG. 1 when processing item data and item data requests in accordance with one embodiment. In one embodiment, the functionality of the flow diagram of FIG. 2, and FIGS. 4 and 5 below, is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 202, module 16 receives data for catalog items to store in an electronic catalog. It will be appreciated by one of ordinary skill that some embodiments may be readily extended to handle data for other types of data management. For example, some embodiments may provide context dependent data management for other types of data presentation, including blog entries, web site design and layout, user-specified preference data, and the like. Although this disclosure discusses the concepts presented herein primarily in terms of catalog items, one will understand that in accordance with some embodiments, context dependent data management extends to all types of context dependent data presentation. Therefore, one of ordinary skill will understand that in some embodiments, "catalog" as used herein may refer generally to a collection of data items. In some embodiments, the data items may be alike such as products or services offered for sale on a web site. In some embodiments, the data items may be disparate.

The data received may be in any agreed format. In one embodiment, item data received is an XML format with entries for each item. Each item may have its own file or may be combined into a larger XML file. Each item may include a common set of item attributes and attribute values. Some of the attributes may be required by the system as expected for each item. Each item may also include one or more defined contexts which may override the common attribute values or specify additional attributes and values specific to the context. With an agreed file format for the input data, the contexts need not be defined in advanced, but may be defined ad hoc for each item. Each item may also include a specified default context to designate the default context for item data retrieval requests that do not specify a context. Otherwise the default context is the common item data. In one embodiment, a default context may be defined for the catalog. Otherwise the default context is the common item data, so that if a context is unspecified in a request, the system may use the default context. Because the system may require certain attributes, the common item data may be presumed valid for items.

FIG. 3*a* illustrates example XML data 302 for an item in accordance with one embodiment. One XML tag specifies an item (line 304) with an id of '1234.' Common data for the item is specified by attribute tags for title (line 306), description (line 308), link (line 310), price (line 312), and instock (line 314). Next, the item specifies two contexts. One context is given the id 'US-Sports' (line 316) and the other is given the id 'US-Swimming' (line 334). In this example, these two contexts denote two different web sites for purchasing sporting equipment products online as can be seen in the example in the value for link for each context.

Context US-Sports (line 316), also specifies values for title (line 318), description (line 320), link (line 322), price (line 328), and instock (line 330). These values will override the common item data values for the US-Sports context. In addition, context US-Sports (line 316) defines additional attributes for an image-link (line 324), an attribute list (line 326) for colors, and an olympic-donation (line 332) value. Context US-Swimming (line 334) specifies values for title (line 336), description (line 338), and link (line 340). These values will override or effectively replace the common item data values for context US-Swimming. In context US-Swimming (line 334) the unspecified values for price and instock will be inherited from the common data values for the item (lines 312 and 314).

As can be seen in this example, a specified context may include additional attributes not found in the common item data attributes or may override or effectively replace the common item data attributes. Each context need not specify the same fields as each other context, but may be independent from one another. One skilled in the art will understand that the XML data of FIG. 3*a* is merely an example data format the system may be configured to accept. Other data formats may be appropriate, including plain text files, simple markup language, spreadsheets, delimited text files, database files, Structured Query Language (“SQL”) statements, and the like.

The following example data and discussion will highlight a use case of the type that may be used with some embodiments. For the purpose of this discussion, a context as described herein is synonymous with a “store.” In some embodiments, the input data may define multiple stores as part of a catalog feed, indicating which items or products are available in each store. Each store may have a name in the catalog XML that may represent distribution centers such as “US-EAST” and “US-WEST,” different physical stores such as “Store-1024” and “Store-2158,” different regions and prices such as “EMEA-Euro” or “EMEA-GBP,” entirely different web sites such as “AcmeClothing” and “AcmeLuggage,” or any other naming style. Any item may have store-specific values for any attribute, allowing a single item to be available in store A but not in store B, or to be available in both stores but presented or priced differently in each. In addition, every item may always be part of the common store, which may provide default values for each common attribute of every item. A web site displaying store items can specify which store the shopper is shopping in as the shopper browses. Item information returned can be configured to include any product in the common store or limited to items explicitly marked as available in the shopper’s current store.

To indicate that an item or product is available in one or more stores, the tag for the store is included within the item’s tag. One instance of the tag for each store in which the product is available is included. For example, to indicate that item 1234 is available in the US-Sports and US-Swimming stores, its item tag may look like:

```
<item id=‘1234’>
    <title>Super Clear Racing Goggles</title>
    <description>These goggles will give you the edge,
        with wall to wall visibility and unmatched UV
        protection</description>
    <link>http://mysite.com/products.jsp?productId=1234
        </link>
    <g:price>24.95</g:price>
    <g:instock>true</g:instock>
        . . .
    <c:store id=‘US-Sports’/>
    <c:store id=‘US-Swimming’/>
</item>
```

This XML says that item 1234 is available in both the US-Sports and US-Swimming stores as well as in the common store, and that it uses the default product attribute values regardless of which store the visitor is shopping in. Naming a store within a tag causes the store to be available in that context.

Each tag may also contain its own item specific tags to provide store-specific values for product attributes. For example, to indicate that the goggles are out of stock for the US-Sports store but still available to shoppers in the US-Swimming store, the catalog feed could indicate so by the following:

```
<item id=‘1234’>
    <title>Super Clear Racing Goggles</title>
```

-continued

```
    <description>These goggles will give you the edge,
        with wall to wall visibility and unmatched UV
        protection</description>
    <link>http://mysite.com/products.jsp?productId=1234
        </link>
    <g:price>24.95</g:price>
    <g:instock>true</g:instock>
    . . .
    <c:store id=‘US-Sports’>
            <g:instock>false</g:instock>
    </c:store>
    <c:store id=‘US-Swimming’/>
</item>
```

If the price of the goggles in the US-Swimming store were $5 higher than the price of the same goggles when sold in any other store, the catalog feed could indicate this as well:

```
<item id=‘1234’>
    <title>Super Clear Racing Goggles</title>
    <description>These goggles will give you the edge,
        with wall to wall visibility and unmatched UV
        protection</description>
    <link>http://mysite.com/products.jsp?productId=1234
        </link>
    <g:price>24.95</g:price>
    <g:instock>true</g:instock>
    . . .
    <c:store id=‘US-Sports’>
            <g:instock>false</g:instock>
    </c:store>
    <c:store id=‘US-Swimming’>
            <g:price>29.95</g:price>
    </c:store>
</item>
```

If a catalog owner had a single global site that is available in multiple countries, where the price displayed on the site depends on the currency of the visitor’s chosen country, one store per currency may be defined and prices specified in the catalog feed as follows:

```
<item id=‘1234’>
    <title>Super Clear Racing Goggles</title>
    <description>These goggles will give you the edge,
        with wall to wall visibility and unmatched UV
        protection</description>
    <link>http://mysite.com/products.jsp?productId=1234
        </link>
    <g:price>24.95</g:price>
    <g:instock>true</g:instock>
    . . .
    <c:store id=“USD”>
            <g:price>29.95</g:price>
    </c:store>
    <c:store id=“CDN”>
            <g:price>16.50</g:price>
    </c:store>
    <c:store id=“AUD”>
            <g:price>10.06</g:price>
    </c:store>
    <c:store id=“EURO”>
            <g:price>12.55</g:price>
    </c:store>
</item>
```

Store-specific values may be defined for any attribute, allowing the catalog owner to present products differently depending on the store in which the items appear. For example, suppose that the US-Sports and US-Swimming stores represent entirely different web sites and visitors to these two sites should see different presentations of the same product. Using store-specific attributes, the title, description, image, click-through uniform resource locator ("URL"), and other attributes may be changed as follows:

```
<item id='1234'>
    <title>Super Clear Racing Goggles</title>
    <description>These goggles will give you the edge,
        with wall to wall visibility and unmatched UV
        protection</description>
    <link>http://mysite.com/products.jsp?productId=1234
        </link>
    <g:price>24.95</g:price>
    <g:instock>true</g:instock>
    . . .
    <c:store id='US-Sports'>
            <title>Crystal Clear Comfort Goggles</title>
            <description>Ultra-clear polycarbonate lenses
                provide protection for swimming and
                paintball.</description>
            <link>http://sports.acme.com/eyewear/product.jsp?
                productId=1234</link>
            <g:image_link>http://images.mysite.com/images/pai
                ntball_goggles.jpg<g:/image_link>
            <c:attribute name="colors" type="list"
                elementType="string">red, blue, clear,
                gray</c:attribute>
    </c:store>
    <c:store id='US-Swimming'>
    <title>Super Clear Competition Goggles</title>
            <description>Low profile design reduces drag for
                better lap times. Ultra-clear polycarbonate
                lenses let you keep an eye on the competition.
                Comfort strap provides a secure
                fit.</description>
            <link>http://swimming.mysite.com/goggles/product.
                jsp?productId=1234</link>
            <g:image_link>http://images.mysite.com/images/rac
                ing_goggles.jpg<g:/image_link>
            <c:attribute name="colors" type="list"
                elementType="string">fire, water, air,
                smoke</c:attribute>
    </c:store>
</item>
```

To remove an attribute from a store, the attribute may be defined with a blank value. For example, suppose that one dollar should be donated to each country's swim team, but some countries do not have a swim team. To achieve the above the catalog owner may do the following:

```
    <item>
        <title>Super Clear Racing Goggles</title>
        <description>These goggles will give you the edge,
            with wall to wall visibility and unmatched UV
            protection</description>
        <link>http://mysite.com/products.jsp?productId=1234</l
            ink>
        <g:price>24.95</g:price>
        <g:instock>true</g:instock>
        <c:attribute name="note" type="string">Get these and
            $1 will be donated to your country's swim
            team!</c:attribute>
        . . .
        <c:store id='USD'/>
        <c:store id='CDN'/>
        <c:store id='VND'>
            <c:attribute name="note" type="string"/>
        </c:store>
    </item>
```

As mentioned above, certain attributes may be required by the system. For example, in cases where the system supports a catalog of products, the following attributes tags may be required: title, description, link, id, image_link, and price.

Using these concepts, a catalog owner may retrieve items from the catalog through simple parameter passing embedded in web page code tags as in the following example:

```
    <div id="cs-cfg" style="display: none">
        <dl class="cs-cfg">
            <dt>retailerId</dt><dd>Your Retailer Id</dd>
            <dt>view</dt>
            <dd>
                <dl>
                    <dt>productId</dt><dd>Your Product Id</dd>
                    <dt>storeId</dt><dd>Your Store Id</dd>
                </dl>
            </dd>
        </dl>
    </div>
```

Requests for catalog items may be also come in the form of JavaScript Object Notation ("JSON") structures, GET and POST commands, URL parameterization, or any other suitable data passing techniques. For example, the above data could be passed using a JSON structure as follows:

```
{
"retailerId":"Your Retailer Id",
"view": {
    "productId":"Your Product Id",
    "storeId":"Your Store Id"
        }
}
```

In another example, the above data could be passed using URL parameterization as follows:

```
http://example.com/request.script/retailerID=Your%20Retaile
r%20ID&view_productId=Your%20Product%20ID&view_storeId=Your
%20Store%20Id.
```

In one embodiment this will cause the system to use the specified store when selecting and displaying items, such as recommendations in Oracle's Oracle Recommendations On Demand. The system will use the store-specific value for instock to determine whether each product is available. The price and other attributes displayed as part of the item on the page will use values from the store rather than the common values.

If store-specific values for instock or other attributes do not exist, the common values will be used for those attributes instead. Store-specific values only need to be provided for attributes to override in a particular store.

The system can recommend any product in the default store or in the specified store. To do this a parameter to set excludeDefaultStore, which may be set to true by default, should be set to false, as in the following example:

```
    <div id="cs-cfg" style="display: none">
        <dl class="cs-cfg">
            <dt>retailerId</dt><dd>Your Retailer Id</dd>
            <dt>view</dt>
            <dd>
                <dl>
                    <dt>productId</dt><dd>Your Product Id</dd>
                    <dt>storeId</dt><dd>Your Store Id</dd>
                    <dt>excludeDefaultStore</dt><dd>false</dd>
                </dl>
            </dd>
        </dl>
    </div>
```

As described above, requests for catalog items may be also come in the form of JavaScript Object Notation ("JSON") structures, GET and POST commands, URL parameterization, or any other suitable data passing techniques.

One of ordinary skill in the art will understand and recognize that the discussion above is merely an example and may be altered as necessary for other contexts, catalogs, and item types. Further, the commands and parameters used to request item data may come in another format.

Turning back to FIG. 2, at 204, described in greater detail below in conjunction with FIG. 4, module 16 imports the data for the catalog items found in the data received at 202. The data may be imported into any suitable data storage device in any appropriate storage format, including a NoSQL database, relational database, spreadsheet, flat files, XML, or the like.

FIG. 3*b* illustrates example data 350 for the items in FIG. 3*a* that may be a representation of item data stored in a database. The column headings allow the system to store the item data for each context without requiring a separate table for the common item data. In this example, the common item data contains its own context identifier that is unlikely to be used by a specified context for a catalog item. The system may specify a reserved word for the common item data context identifier, such as "common" or "default." Special characters may be used to help denote the special status of the common item data context identifier, as in "::default::" or "c.d", and allow other specified context identifiers to use "common" or "default" as another specified context. One skilled in the art will understand that the context identifier for the common item data may be selected to be any string of characters, and need not be limited to alpha-numeric characters. The context identifier for common item data may also be a NULL value, specifically setting the context identifier as NULL for the common item data. Data 350 includes a retailer-id (column 352), context-id (column 354), and item-id (column 356) that taken together present a key to any item in the database. Retailer-id (column 352) designates the retailer whose items are stored. Item-id (column 356) designates the item for which attributes and values are defined. Context-id (column 354) designates the specified context for which an item's attributes and values are defined. As explained above, the common item data may be assigned an expected or reserved context-id, in this example "c.data" (see, e.g., column 354, line 368)

Data 350 also includes a 'name' (column 358) and 'value' (column 360) as well as columns for entry-type (column 362), collection-type (column 364), and sequence-number (column 366). 'Name' (column 358) designates the name of the attribute defined. 'Value' (column 360) designates the corresponding value for the attribute. Entry-type (column 362) may allow the system to assign different types to each kind of name/value pair. For example, the types may include images, URLs, monetary values, text values, etc. Collection-type (column 364) may allow the system to view one 'name' with multiple 'values' as a collection of options in a checkbox list, select list, radio list, etc. For example, one embodiment may allow a catalog item to designate multiple available colors, allowing the customer to choose any one or two colors for the end product. For a collection, sequence-number (column 366) may allow the system to set an order to display the collection items.

Turning back to FIG. 2, at 206, described in greater detail below in conjunction with FIG. 5, module 16 receives a request for item information. The request may contain a value for the retailer-id or the system may know the retailer-id based on the request channel, request address, login information, or key code. The request may also specify a certain item to retrieve or may be open to retrieve any items. In some embodiments, the request may contain a target item and may be a request for product recommendations in the catalog based on the target item. The request may include a specified context for the items. The request may specify a context to assign as the default context for an item or the catalog. The request may include an indicator, indicating catalog items should be retrieved from the entire catalog or whether only the items in the specified or default context should be retrieved.

At 208, the item data is provided by module 16. In one embodiment, the data may be provided in JSON, nested key value pairs, XML data, HyperText Markup Language version 5 ("HTML5") data attributes, or the like. The format of the provided data may be flexible. The requestor may expect a particular format or may be able to specify a format for the data provided by module 16. Using the data provided, the requestor may include context specific item data in a web page. If a context is specified in the request, as described in further detail below in conjunction with FIG. 5, the provided data should effectively take the common item data and override that data with the specified context's data for attributes with the same 'name.' Based on the nature of the request, as described in greater detail below, additional item data may be retrieved by specifying preferences in the returned catalog data. In one embodiment, items that are not in stock that would otherwise be returned with the provided data will be withheld from the provided data automatically by module 16. Thus, automatic customization of product data may be provided by the system so that the representation of the product is appropriate for the context in which it is being displayed, thereby eliminating the need to provide customized presentation code on the display side.

Figure 4:
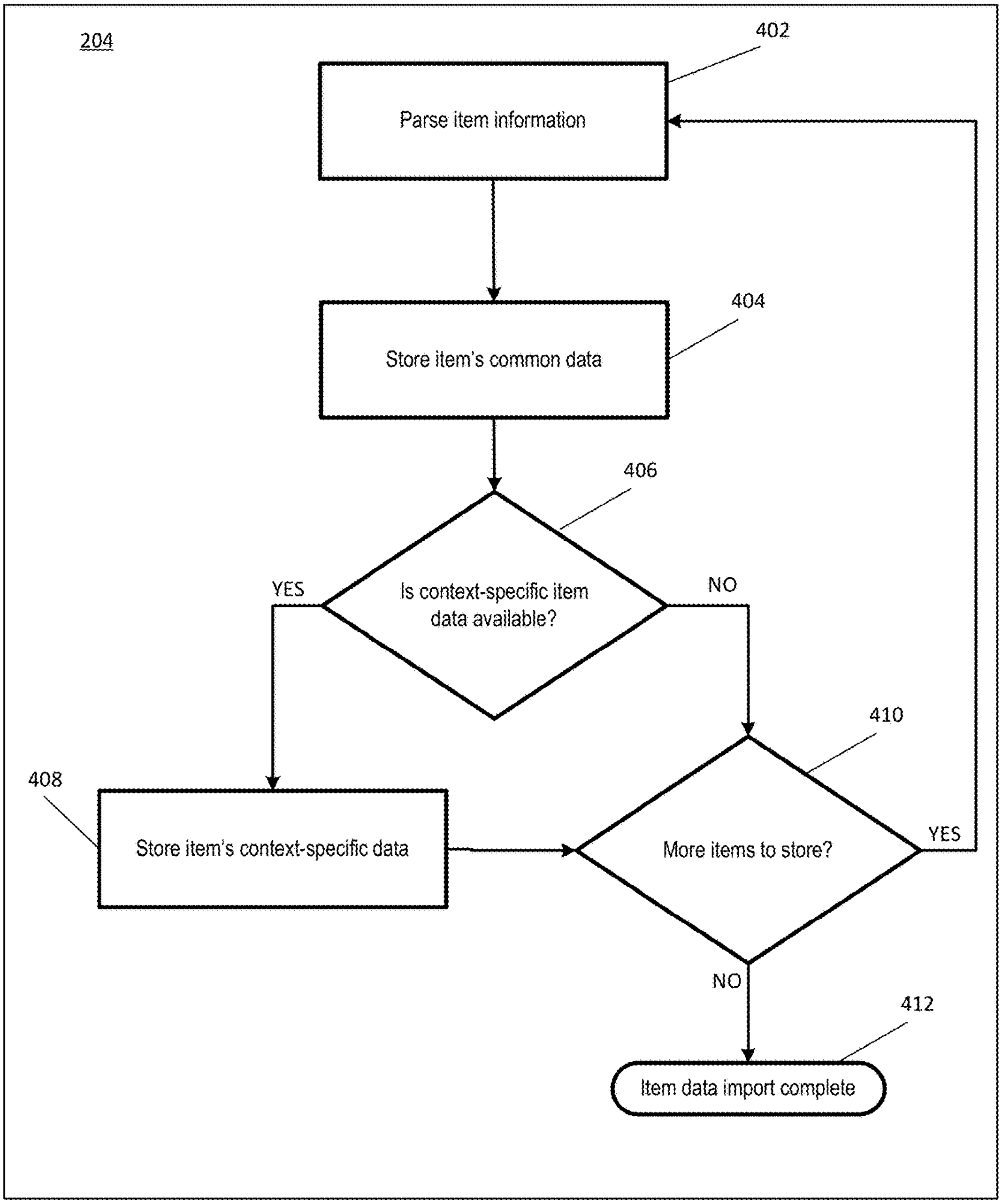
FIG. 4 is a flow diagram of the functionality of the context dependent data management module of FIG. 1 when processing item data in accordance with some embodiments and consistent with FIG. 2.

FIG. 4 is a flow diagram of the functionality of context dependent data management module 16 of FIG. 1 when processing item data in accordance with some embodiments and consistent with flow diagram element 204 of FIG. 2.

At 402, item information is parsed. The method of parsing may be dependent on the format of the item information received. For example, if the format of the item information is in an XML file, as in the snippet shown in FIG. 3*a*, the system may use an XML parser to navigate the data. In some embodiments, the system may use a text file parser, while in other embodiments, the system may parse the data through SQL statement executions. Multiple parsing techniques may be applied depending on the format of the data information to store. Although the flow diagram of FIG. 4 represents flow diagram element 204 of FIG. 2 as a series of discrete logic, the information format may be such that it can be stored directly into the system without parsing or manipulation. Thus, the flow diagram of FIG. 4 may be optional in some embodiments. Further, the order presented in the flow diagram is not necessarily critical. In some embodiments the flow diagram elements in FIG. 4 may be executed in parallel, reverse order, or in alternating order.

At 404, information for an item's common data is stored. The common data includes named attributes and values for an item that are not contained within a specified context. In some embodiments, the system may establish a required set of attributes to store in the common data for an item, such as price, availability, URL link, description, etc.

At 406, the system determines whether context-specific item data is available for the item. If not, the system moves on to 410. If so, at 408, information for an item's context-specific item data is stored. In some embodiments, context-specific item data may include some, all, or none of the same attributes as those listed in the common item data. In some embodiments, context-specific item data may include attributes that are provided in addition to the common data. If more than one context is specified, attributes may be specified for each context without regard to the other contexts, may follow a set format for all or some contexts, may contain some overlapping attributes among contexts, or may include one of the former approaches for some contexts and another of the former approaches for other contexts within the same item.

At 410, the system determines whether more items are available to store. If so, the system goes back to 402 to continue processing the next item's data. If not, at 412, the system completes the item data storage.

Figure 5:
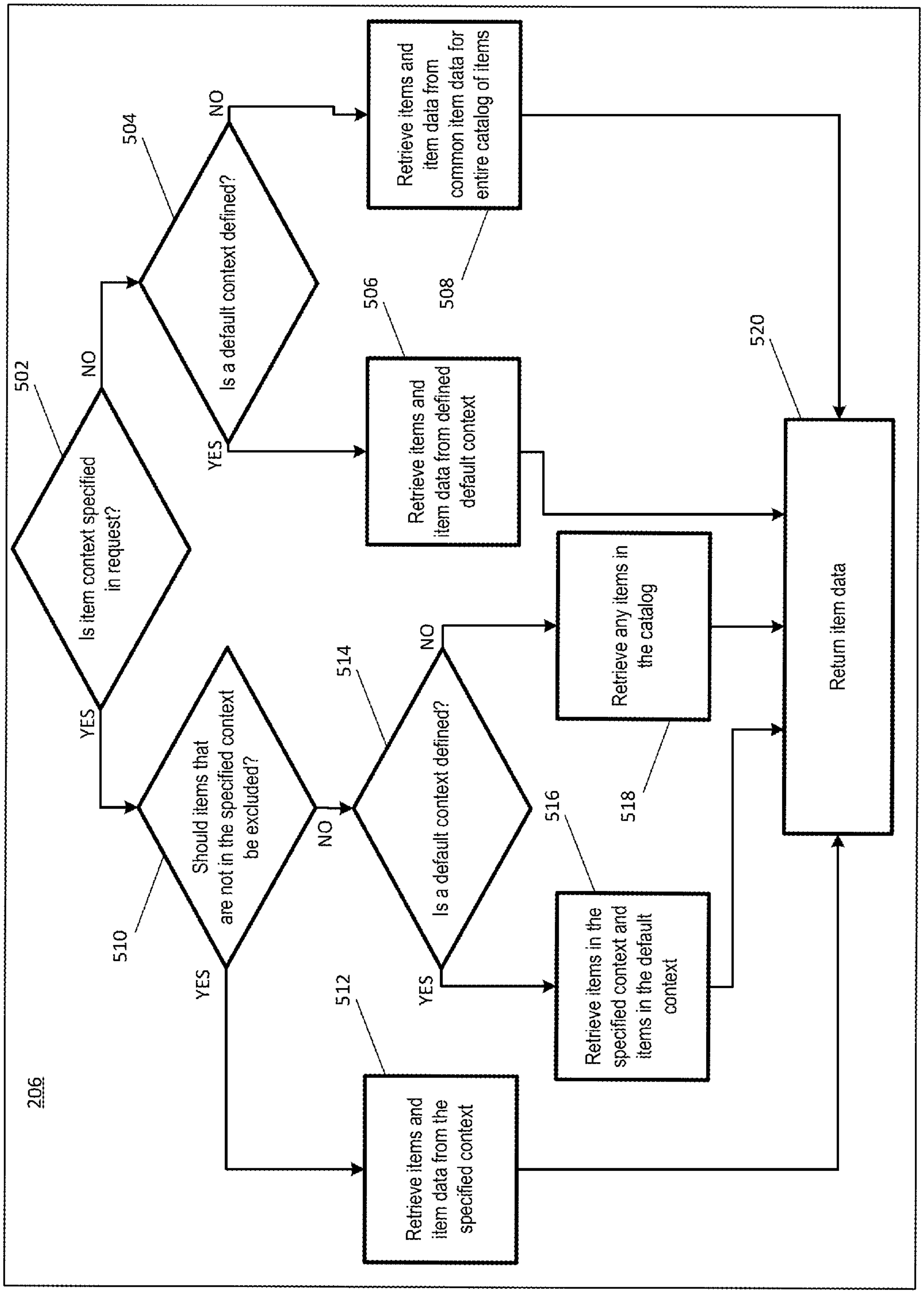
FIG. 5 is a flow diagram of the functionality of the context dependent data management module of FIG. 1 when processing a request for item data in accordance with some embodiments and consistent with FIG. 2.

FIG. 5 is a flow diagram of the functionality of context dependent data management module 16 of FIG. 1 when processing a request for item data in accordance with some embodiments and consistent with flow diagram element 206 of FIG. 2. One of ordinary skill in the art will understand and appreciate that the flow diagram of FIG. 5 is merely an example. The same or similar logic may be arrived at by altering the flow diagram to change the order of the flow diagram elements. The logic may also be altered to provide modified behavior in some embodiments. One should understand that the results provided as described below may be further restricted or filtered through the use of other modules, such as an item recommendation module or item search module. In such instances, the results provided will be all results that meet the restrictions of other such modules and the specified or default contexts as applicable.

At 502, the system determines whether the request for item data specifies a context for the item requested. The specified context may be within the request itself as a parameter or the system may be able to determine the specified context from other aspects of the request. For example, the source Internet Protocol ("IP") address originating the request, a URL or domain name associated with the request, a reference item to be used by other modules (such as a product recommendation module), or the like. If a context is not specified, the system moves to 504.

At 504, the system determines whether a default context is defined. A default context may be defined in the request or may have been previously defined, for example when item data was provided to the system in 202. If a default context is defined, at 506 the system will retrieve items and item data from the defined default context.

If at 504, a default context is not defined, at 508 the system will retrieve items and item data from the entire catalog, using the common item data attributes. In other words, items and item data retrieved are not restricted based on a specified or default context, however as described above, the items and item data retrieved may be restricted or filtered based on logic or parameters used by other modules in the system.

If at 502, a context is specified in the request, at 510 the system determines whether items that are not in the specified context should be excluded. In other words, the system will determine whether to include items that fall outside the specified context. To make this determination, a parameter may be defined that tells the system whether to exclude default data. The parameter may be defined in the request, in a previous configuration of the catalog, or in a default state (where the parameter has not been defined by the requestor). The default state may be to exclude items in the default context when a specified context is present.

If items that are not in the specified context should be excluded, at 512 the system will retrieve items and item data from the catalog where the item is included in the specified context.

If at 510, items that are not in the specified context should not be excluded, then at 514, the system determines whether a default context is defined (similar to element 504, discussed above). If a default context is defined, at 516 the system will retrieve items and item data from the catalog where the item is included in either the specified context or the default context. If at 514, a default context is not defined, at 518 the system may retrieve any item and item data from the catalog. For items in the specified context, the data attributes from the specified context may be used. For items that are not in the specified context, the common item data attributes may be used. However, as described above, the items and item data retrieved at 516 or 518 may be restricted or filtered based on logic or parameters used by other modules in the system.

At 520, the item data is returned and eventually provided by the system at 208. The item data that is returned depends on the parameters that have been set in the request or defined for the catalog of items. The item data may be passed to additional modules to support additional functionality 18, such as product recommendations or product searches. Such additional modules may further restrict or filter the results ultimately provided at 208. One will appreciate that such additional modules may alternatively restrict or filter the item data before entering the example flow diagram of FIG. 5.

Figure 6:
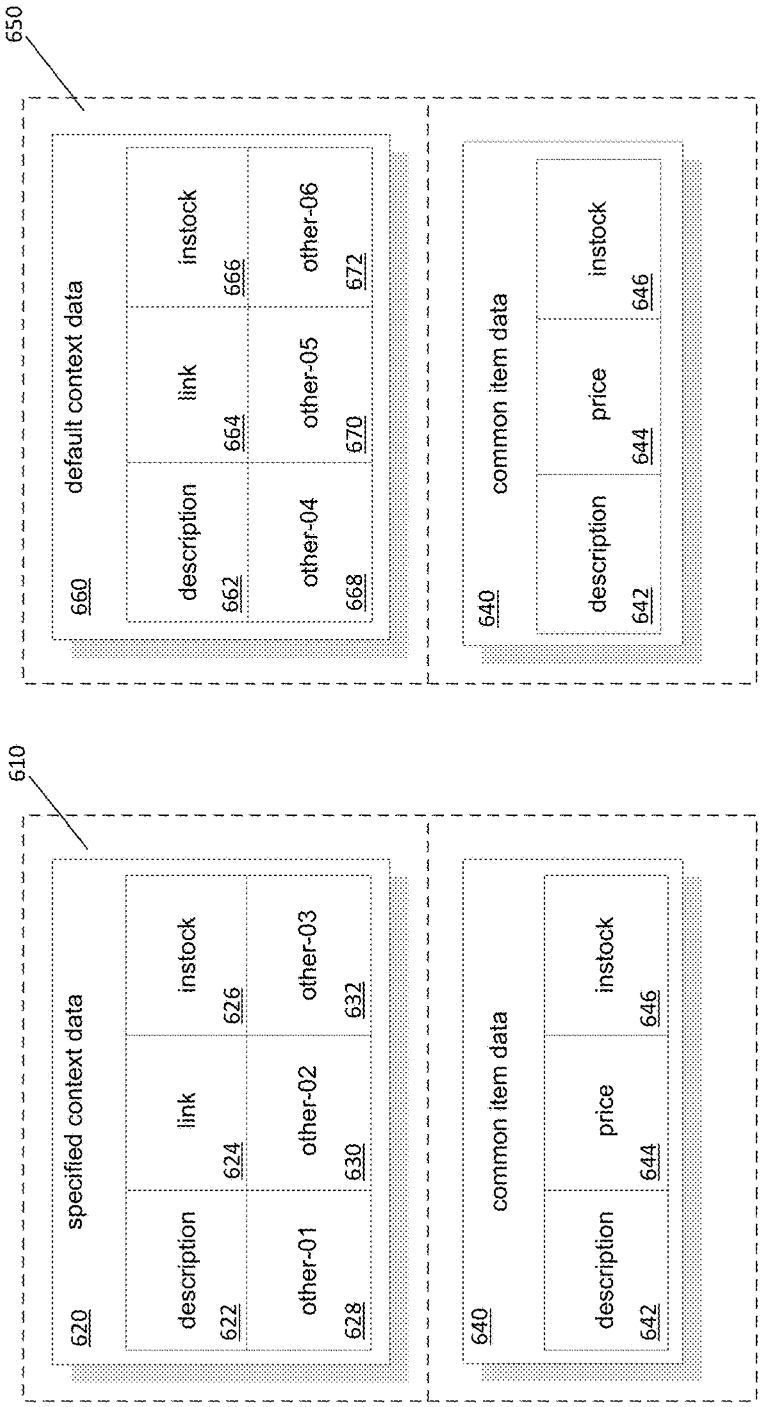
FIG. 6 illustrates example attributes for an item in a specified context and in a default context in accordance with one embodiment.

The item attributes and values returned from each of data flow elements 506, 508, 512, 516, and 518, may be different according to each element. At 506, the system will retrieve items and item data from the defined default context. FIG. 6 illustrates example attributes for an item in a specified context and in a default context in accordance with one embodiment. As shown in FIG. 6, an example default defined context may be represented by 650. In this example, each of the items returned at 506 will have attributes for the default context data 660, including description 662, link 664, instock 666, other-04 668, other-05 670, and other-06 672, as well as inherited attributes and values from the common item data 640, including price 644. Description 642 and instock 646 will not be inherited because these are defined in default context data 660. An alternative configuration may also return any items, including those that are not in defined default context 650, using common item data similar to 640 for the attributes. In the alternative configuration, each of the additional items returned at 506 may have attributes for common item data 640 including description 642, price 644, and instock 646.

At 508, the system will retrieve items and item data from the entire catalog, using the common item data. Referring again to FIG. 6, in this example each of the items returned at 508 will have attributes the same as common item data 640, including description 642, price 644, and instock 646. No other context-specific data is returned.

At 512, the system will retrieve items and item data from the catalog where the item is included in the specified context. Because items that are not in the specified context are excluded, only the items in the specified context will be included. Referring again to FIG. 6, an example specified context may be represented by 610. In this example each of the items returned at 512 will have attributes for specified context data 620, including description 622, link 624, instock 626, other-01 628, other-2 630, and other-03 632, as well as inherited attributes and values from the common item data 640, including price 644. Description 642 and instock 646 will not be inherited because these are defined in specified context data 620.

At 516, the system will retrieve items and item data from the catalog where the item is included in either the specified context or the default context. Here the system may be configured to behave in two different manners. In the first configuration option, the system may be configured to treat the default context data as if it were common item data. In the second configuration option, the system may be configured to treat the default context data as if it were a secondary context to be returned. In both cases, catalog items that are in neither the specified context data nor default context data will not be returned. Referring again to FIG. 6, in this example for the first configuration option, each of the items returned at 516 will have attributes for specified context data 620, including description 622, link 624, instock 626, other-01 628, other-02 630, and other-03 632, as well as inherited attributes and values from default context data 660, including other-04 668, other-05 670, and other-06 672, as well as inherited attributes and values from common item data 640, including price 644. Description 662 and 642, link 664, and instock 666 and 646 will not be inherited because these are defined in specified context data 620. For the second configuration option, each of the items returned at 516 will have attributes for specified context data 620, including description 622, link 624, instock 626, other-01 628, other-02 630, and other-03 632, as well as inherited attributes and values from common item data 640, including price 644. Description 642, link 664, and instock 646 will not be inherited because these are defined in specified context data 620. Notably, the second configuration option does not include disparate default context data in the specified context data information returned.

At 518, the system may retrieve any items and item data from the catalog. The items in the specified context may be included as well as the other items in the catalog. However, again as described above, the item and item data returned may be further restricted or filtered depending on parameters or logic used in the system to provide filtered results. Referring again to FIG. 6, in this example each of the items returned in the specified context 610 at 518 will have attributes for specified context data 620, including description 622, link 624, instock 626, other-01 628, other-02 630, and other-03 632, as well as inherited attributes and values from the common item data 640, including price 644. Description 642 and instock 646 will not be inherited because these are defined in specified context data 620. Each of the other items returned that are not in specified context 610 at 518 will have attributes the same as common item data 640, including description 642, price 644, and instock 646.

As disclosed, embodiments receive item data for catalog items, store the item data, receive a request for item data from a catalog of items, and provide the item data according to the request. The item data may also include attribute information tied to different contexts for which the data may be used. The request for item data may also include a specified context to retrieve item data for the specified context.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A non-transitory computer readable medium having instructions stored thereon that, when executed by a processor, cause the processor to retrieve product information from a product selected from an ecommerce web site, the retrieving comprising:

receiving a first request from a first web site store for first item data for the product from an Extensible Markup Language (XML) file that comprises an electronic product catalog, the first request including a first context for providing the first item data and is in response to a selection of a first link corresponding to the product;

receiving a second request from a second web site store that is different than the first web site store for second item data for the product from the XML file, the second request including a second context for providing the second item data that is different than the first context and is in response to a selection of a second link corresponding to the product;

wherein the XML file comprises for the product, a plurality of common item attribute values, at least one first context item attribute value for the first context and at least one second context item attribute value for the second context;

parsing the XML file in response to the first request and replacing at least one of the common item attribute values with the first context item attribute value, wherein the parsing and replacing forms the first item data;

parsing the XML file in response to the second request and replacing at least one of the common item attribute values with the second context item attribute value, wherein the parsing and replacing forms the second item data; and providing the first item data to the first web site store and the second item data to the second web site store, wherein the first item data is different than the second item data.

2. The computer readable medium of claim 1, wherein the retrieving further comprises receiving an indicator for setting a default context for providing item data.

3. The computer readable medium of claim 2, wherein the provided first item data further includes data for the default context.

4. The computer readable medium of claim 1, wherein the first context comprises an identity of the first web site store.

5. The computer readable medium of claim 1, wherein the first context item attribute value comprises an XML tag in the stored data set.

6. The computer readable medium of claim 1, wherein the first context item attribute value comprises an indication of an availability of the product.

7. The computer readable medium of claim 6, wherein the second context item attribute value comprises the indication of the availability of the product, and the indication of the first data item comprises the product is available on the first web site store and the indication of the second data item comprises the product is not available on the second web site store.

8. A computer implemented method for retrieving data for an ecommerce web site, the method comprising:

receiving, by a computer system, a first request from a first web site store for first item data for a product from an Extensible Markup Language (XML) file that comprises an electronic product catalog, the first request including a first context for providing the first item data and is in response to a selection of a first link corresponding to the product;

receiving a second request from a second web site store that is different than the first web site store for second item data for the product from the XML file, the second request including a second context for providing the second item data that is different than the first context and is in response to a selection of a second link corresponding to the product;

wherein the XML file comprises for the product, a plurality of common item attribute values, at least one first context item attribute value for the first context and at least one second context item attribute value for the second context;

parsing the XML file in response to the first request and replacing at least one of the common item attribute values with the first context item attribute value, wherein the parsing and replacing forms the first item data;

parsing the XML file in response to the second request and replacing at least one of the common item attribute values with the second context item attribute value, wherein the parsing and replacing forms the second item data; and providing, by the computer system, the first item data to the first web site store and the second item data to the second web site store, wherein the first item data is different than the second item data.

9. The method of claim 8, wherein the retrieving further comprises receiving an indicator for setting a default context for providing item data.

10. The method of claim 9, wherein the provided first item data further includes data for the default context.

11. The method of claim 8, wherein the first context comprises an identity of the first web site store.

12. The method of claim 8, wherein the first context item attribute value comprises an XML tag in the stored data set.

13. The method of claim 8, wherein the first context item attribute value comprises an indication of an availability of the product.

14. The method of claim 13, wherein the second context item attribute value comprises the indication of the availability of the product, and the indication of the first data item comprises the product is available on the first web site store and the indication of the second data item comprises the product is not available on the second web site store.

15. A system that retrieves data for an ecommerce web site, the system comprising:

a receiving module to receive a first request from a first web site store for first item data for a product from an Extensible Markup Language (XML) file that comprises an electronic product catalog, the first request including a first context for providing the first item data and is in response to a selection of a first link corresponding to the product; and receive a second request from a second web site store that is different than the first web site store for second item data for the product from the XML file, the second request including a second context for providing the second item data that is different than the first context and is in response to a selection of a second link corresponding to the product;

wherein the XML file comprises for the product, a plurality of common item attribute values, at least one first context item attribute value for the first context and at least one second context item attribute value for the second context;

parsing the XML file in response to the first request and replacing at least one of the common item attribute values with the first context item attribute value, wherein the parsing and replacing forms the first item data;

parsing the XML file in response to the second request and replacing at least one of the common item attribute values with the second context item attribute value, wherein the parsing and replacing forms the second item data; and a providing module to provide the first item data to the first web site store and the second item data to the second web site store, wherein the first item data is different than the second item data.

16. The system of claim 15, wherein the retrieving further comprises receiving an indicator for setting a default context for providing item data.

17. The system of claim 16, wherein the provided first item data further includes data for the default context.

18. The system of claim 15, wherein the first context comprises an identity of the first web site store.

19. The system of claim 15, wherein the first context item attribute value comprises an XML tag in the stored data set.

20. The system of claim 15, wherein the first context item attribute value comprises an indication of an availability of the product.

21. The system of claim 20, wherein the second context item attribute value comprises the indication of the availability of the product, and the indication of the first data item comprises the product is available on the first web site store and the indication of the second data item comprises the product is not available on the second web site store.

* * * * *